(12) United States Patent
Cline et al.

(10) Patent No.: US 10,690,261 B2
(45) Date of Patent: Jun. 23, 2020

(54) MULTI-PRESSURE RATED VALVE ASSEMBLY

(71) Applicant: Rosemount Inc., Shakopee, MN (US)

(72) Inventors: Vincent E. Cline, Brenham, TX (US); Paul R. Fadell, Cypress, TX (US)

(73) Assignee: Rosemount Inc., Shakopee, MN (US)

( * ) Notice: Subject to any disclaimer, the term of this patent is extended or adjusted under 35 U.S.C. 154(b) by 152 days.

(21) Appl. No.: 15/390,147

(22) Filed: Dec. 23, 2016

(65) Prior Publication Data

US 2018/0180196 A1 Jun. 28, 2018

(51) Int. Cl.
| *F15B 13/00* | (2006.01) |
| *F16K 41/02* | (2006.01) |
| *F16K 41/04* | (2006.01) |
| *F16K 1/38*  | (2006.01) |

(52) U.S. Cl.
CPC ............ *F16K 41/02* (2013.01); *F16K 1/38* (2013.01); *F16K 41/04* (2013.01)

(58) Field of Classification Search
CPC ............ F16K 1/02; F16K 27/02; F16K 41/02
USPC .................................................. 137/269, 271
See application file for complete search history.

(56) References Cited

U.S. PATENT DOCUMENTS

| 3,976,279 A * | 8/1976 | Walker ............... F16K 31/508 251/267 |
| 4,860,784 A * | 8/1989 | Petersen .............. F16K 1/02 137/315.28 |
| 5,722,638 A * | 3/1998 | Miller ................. F16K 1/305 251/266 |
| 6,453,933 B1 * | 9/2002 | Oi ....................... B08B 9/00 137/242 |
| 6,991,216 B1 * | 1/2006 | Wilson ................ F16K 41/02 251/214 |
| 8,640,560 B2 | 2/2014 | Burke |
| 9,239,114 B2 | 1/2016 | Lee |
| 2004/0027912 A1 | 2/2004 | Bibbo et al. |
| 2012/0240686 A1 | 9/2012 | Blomberg et al. |
| 2014/0109970 A1 | 4/2014 | Middleton |
| 2014/0110617 A1 | 4/2014 | Middleton |

FOREIGN PATENT DOCUMENTS

WO  WO 2013/034891  3/2013

OTHER PUBLICATIONS

International Search Report and Written Opinion, dated Mar. 21, 2018, for International Patent Application No. PCT/US2017/065253, pp. 13.
First Office Action dated Jan. 3, 2019, for Chinese Patent Application No. 201710126540.8, 19 pages, including English translation.

(Continued)

*Primary Examiner* — Reinaldo Sanchez-Medina
(74) *Attorney, Agent, or Firm* — Christopher R. Christenson; Kelly, Holt & Christenson PLLC (57) ABSTRACT

A multi-seat bonnet for a valve assembly comprising is disclosed herein. The multi-seat bonnet includes a locking mechanism that is configured to secure the multi-seat bonnet to the valve assembly. Further, the multi-seat bonnet includes a first sealing surface configured to engage a high pressure seat, in addition to a second sealing surface configured to engage a low pressure seat.

17 Claims, 11 Drawing Sheets

(56) References Cited

OTHER PUBLICATIONS

Second Office Action dated Aug. 12, 2019, for Chinese Patent Application No. 201710126540.8; 120 pages including English translation.
Third Office Acton dated Feb. 19, 2020, for Chinese Patent Applicaton No. 201710120540.8, 17 pages including English Translation.

* cited by examiner

MULTI-PRESSURE RATED VALVE ASSEMBLY

BACKGROUND

The present disclosure generally relates to process pressure measurement. More specifically, but not by limitation, the present disclosure relates to pressure transmitter assemblies with mechanical features configured to support multiple pressure ratings.

There are currently a wide variety of process environments. Process environments can include one or more systems that provide a process variable as an informative output. The term process variable generally refers to feature of a process, such a chemical or physical feature, that can change based on a variety of factors within the process. Examples of process variables can include pressure, temperature, flow, conductivity, pH, and other properties. One goal of monitoring a process environment is to obtain a process measurement. For instance, pressure is considered to be a basic process variable that is used for the measurement of flow, which is generally the difference of two pressures.

In order to obtain a process measurement, many process environments include a process transmitter. Process transmitters usually include a sensor that responds to a measured process variable with a sensing element. The sensing element converts the variable to a standardized transmission signal as an output for recordation and/or control. Industrial process transmitters can be used to measure a variety of process variables in a variety of process environments including, but not limited to, industrial processes such as slurries, liquids, vapors and gases in chemical, pulp, petroleum, gas, pharmaceutical, food and other processing plants. One particular type of process transmitter includes a fluid pressure transmitter.

Pressure transmitters are typically coupled to a process by virtue of a manifold. As such, a manifold can be an assembly between a process and a transmitter that carries a process fluid though one or more channels to the transmitter for measurement. Manifolds can include a variety of channel configurations including those found in integral manifolds, conventional manifolds, inline manifolds, and/or coplanar manifolds. As an example, manifolds and their associated channel configurations can include those available from Rosemount Inc. of Chanhassen, Minn. under the trade designations Model 304, Model 305 and Model 306 manifolds.

Each channel of the manifold may be opened or closed by a valve assembly to control the flow of the process fluid. Valve assemblies generally operate to isolate a process sample, equalize a process flow, and/or vent or drain a fluid flow from the process. Coplanar manifolds, in particular, can have any number of valves such as those with two, three, or five valve configurations. Manifolds typically have at least one valve that provides pressure transmitter isolation. For instance, an isolation valve will be actuated to open or close a fluid channel to a sample chamber or to another area within the manifold that leads to a pressure sensor.

The particular type of manifold that is used for a process may depend on several factors. For one, it may depend on the type of process fluid that is being sampled. For example, chemical solutions may be more suited for a coplanar manifold while water-based solutions are more suited for an integral manifold. More importantly, however, the selection of a manifold and its associated components, such as a valve assembly, may depend on the pressure of the process fluid. In some process environments, there are two primary pressure ratings for manifold assemblies. These include a low pressure rating of 6,092 pounds per square inch (PSI), and a high pressure rating of 10,000 PSI or higher. In addition, some industry standards require that the products be tested at a much higher pressure rating than that which will be produced by the process. For example, some products must pass qualification at four times the pressure rating that is observed in the process.

SUMMARY

A multi-seat bonnet for a valve assembly comprising is disclosed herein. The multi-seat bonnet can include a locking mechanism that is configured to secure the multi-seat bonnet to the valve assembly. Further, the multi-seat bonnet includes a first sealing surface configured to engage a high pressure seat, in addition to a second sealing surface configured to engage a low pressure seat.

DETAILED DESCRIPTION OF ILLUSTRATIVE EMBODIMENTS

Manifold assemblies are conventionally designed to meet a particular pressure rating. Based on the pressure rating, a number of internal channels within the manifold, the diameter of those channels, and a port size of the channels can vary. One particular feature of manifolds that can vary with pressure rating is a valve seat. A valve seat generally includes an interface at an interior channel of a manifold that engages a valve assembly. One function of this intersection is to provide a sealing surface that prevents fluid leakage.

Valve seats, and thus the valves that engage the seats, are typically designed in accordance with either a high pressure rating or a low pressure rating, but not both. This is not ideal. Using two different valve assemblies makes it difficult to leverage valve inventory and requires maintaining two different product lines. This can undesirably increase manufacturing costs. Alternatively, a high pressure valve assembly may be used with both low pressure and high pressure seats. However, this is also not ideal as it would put undue manufacturing and design restraints on low pressure manifolds. For instance, in order to accommodate a high pressure valve assembly, one would need to limit the number of internal channels and their size within the low pressure manifold.

It is generally provided herein that a single valve assembly may be used with multiple pressure ratings. For instance, a single valve assembly design may be used for different valve seats, each of the valve seats being designed in accordance with a different pressure rating. A multi-pressure rated valve assembly may allow for the most flexibility as to the positioning of channels within the manifold and the port size of those channels. This may decrease manufacturing costs and streamline product management while adhering to the requirements of industry standard.

Figure 1:
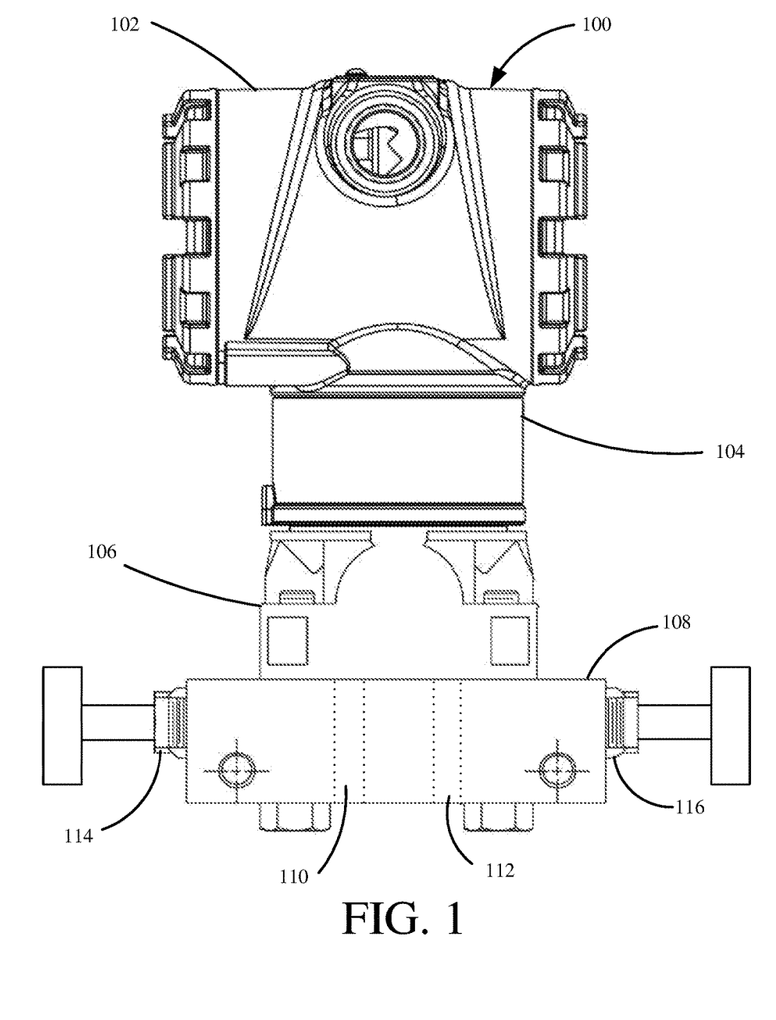
FIG. 1 is a diagrammatic view of a pressure transmitter with which embodiments of the present invention are particularly useful.

FIG. 1 is a diagrammatic view of a pressure transmitter 100 coupled to a coplanar manifold 108. Pressure transmitter 100 illustratively includes an electronic housing 102 coupled to a sensor compartment 104, which is further coupled to an isolator assembly 106. It is illustratively shown that isolator assembly 106 is further coupled to manifold 108. Manifold 108 illustratively includes a plurality of process fluid inlets 110, and 112 that may receive a process fluid. Pressure transmitter 100 further includes a plurality of valve assemblies 114 and 116. Each of valve assemblies 114 and 116 is received into a channel opening within manifold 108.

Figure 2:
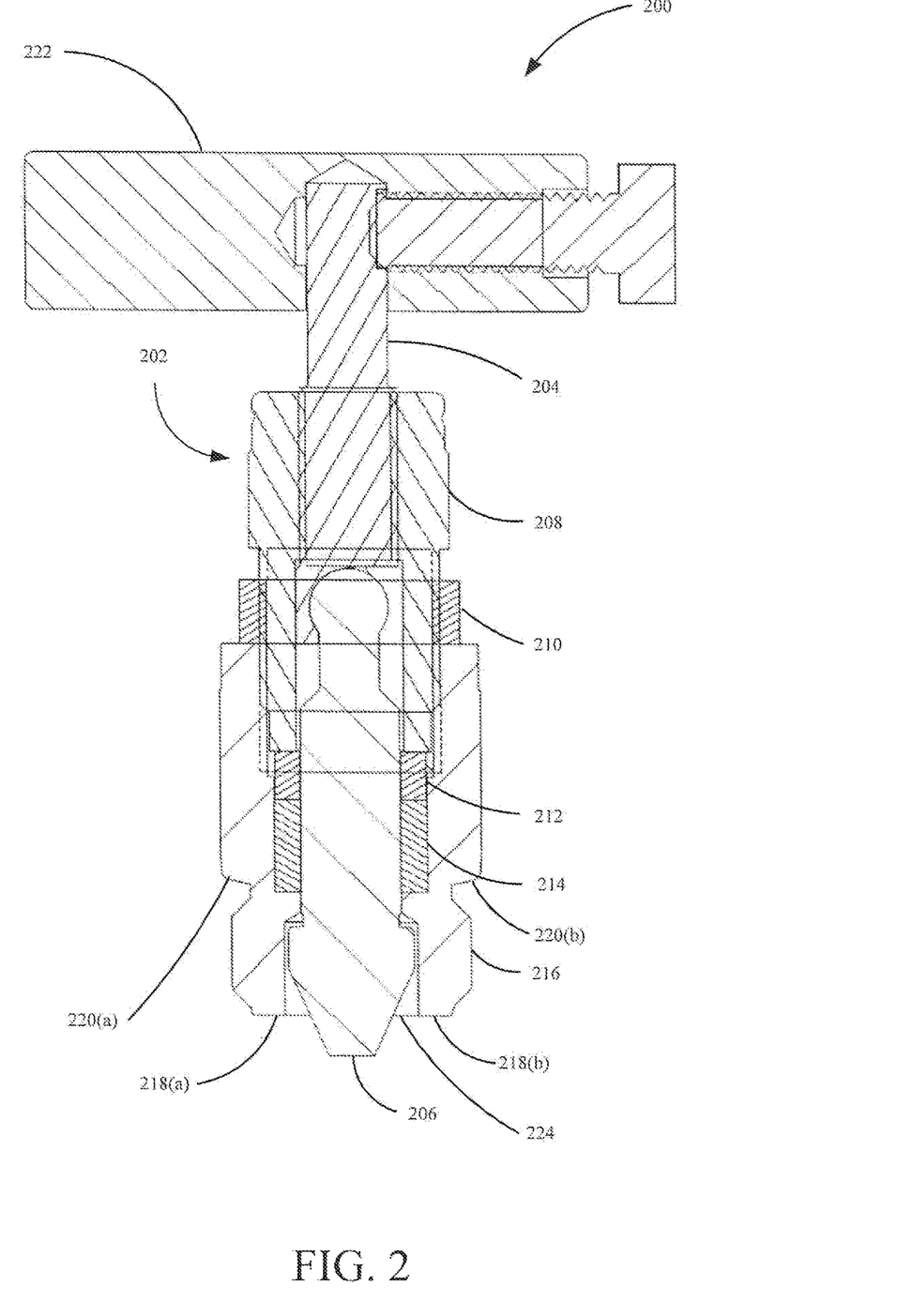
FIG. 2 is a cross-sectional view of a valve assembly in accordance with one embodiment of the present invention.

FIG. 2 is a cross-sectional view of a valve assembly 200, in accordance with one embodiment of the present invention. Valve assembly 200 is configured to control a flow of a process fluid by opening, closing, or partially obstructing the passageway between the valve and a manifold. It is shown in FIG. 2 that valve assembly 200 illustratively includes a valve body 202. Valve body 202 is configured to receive a valve stem 204, which is coupled to an actuator 222. Actuator 222 can be engaged (e.g., rotated) to move stem 204 vertically (e.g. up and down) within valve body 202. For instance, valve body 202, on an interior surface, has at least one threaded portion that receives a threaded portion of stem 204. As such, as stem 204 is rotated within body 202 the stem engages the threads to protrude or retract stem tip 206 from a valve opening 224. Stem 204 may be secured to valve body 202 with a packing nut 208. In one particular example, packing nut 208 may engage threads on valve body 202 to secure the stem 204 with respect to valve body 202.

In accordance with one embodiment of the present invention, valve assembly 200 also includes a bonnet 216. Bonnet 216 can serve a variety of purposes with respect to valve assembly 200. In manufacture, bonnet 216 may be secured to the valve body 202 to enclose the portion of body 202 through which stem 204 passes. Bonnet 216 may be secured to valve body 202 in a variety of ways including, but not limited to, a weld, a bolting arrangement, or another configuration. As illustratively shown in FIG. 2, bonnet 216 is secured to valve body 202 with bonnet lock 210.

The attachment of bonnet 216 to valve body 202 forms a pressure boundary such that the valve body is leak proof when engaging a manifold assembly. Further included in FIG. 2, it is shown that along an interior portion of valve body 202, a packing ring 212 and a packing 214 are configured to engage at least a portion of bonnet 216 and stem 204. Packing ring 212 and packing 214 can include a variety of materials that aid in securing the bonnet 216 with respect to valve body 202. For example, packing 214 may include any of polytetrafluoroethylene (PTFE), graphite-based material, or fluoro-elastomer (FKM) material.

Valve assembly 200 is configured to be utilized as a multi-seat valve assembly, such that the valve can be used with both high pressure manifold seats and low pressure manifold seats. While high pressure and low pressure manifolds can vary in their seat arrangements, it is provided herein that bonnet 216 is configured for use with both pressure-rated seat designs. For instance, bonnet 216 is configured to engage seats in accordance with a high pressure rating at 10,000 PSI or higher and/or a low pressure rating at 6,092 PSI.

One particular feature of bonnet 216 includes a multi-sealing surface arrangement. Bonnet 216 illustratively includes a first sealing surface, with portions that are generally represented by reference numerals 218A and 218B. Because FIG. 2 generally depicts a cutaway view, it is noted that portions 218A and 218B are indicative of the same first sealing surface as it passes around opening 224. For purposes of discussion only, portions 218A and 218B will be generally described as a first sealing surface 218. First sealing surface 218 may seal to one or more surfaces of a high pressure seat. For example, sealing surface 218 engages one or more surfaces of a 10,000 PSI or higher rated pressure seat. It is shown that first sealing surface 218 is substantially adjacent a valve opening 224 of bonnet 216. In addition to sealing surfaces that are designed for high pressure fluid, bonnet 216 illustratively includes a second sealing surface, which is generally represented by portions 220A and 220B. Because FIG. 2 generally depicts a cutaway view, it is noted that portions 220A and 220B are indicative of the same second sealing surface as it passes around an exterior portion of bonnet 216. For purposes of discussion only, portions 220A and 220B will be generally described as a second sealing surface 220. Second sealing surface 220 may be configured for use with a low pressure manifold seat design. For example, second sealing 220 engages one or more surfaces of a 6,092 PSI rated pressure seat. Thus, in one embodiment, bonnet 216 comprises a multi-seat bonnet. As such, valve assembly 200 can engage a valve seat design for multiple different pressure ratings without requiring reinstallation or reassembly of valve assembly 200. This can both reduce manufacturing costs and aid in installation as fewer parts and product assemblies are required for different pressure ratings.

In another embodiment, bonnet 216 is configured to seal on multiple sealing surfaces, thereby creating a redundant seal. For instance, sealing surface 218 and 220 may engage one or more seat surfaces of a manifold assembly at substantially the same time.

Figure 3A:
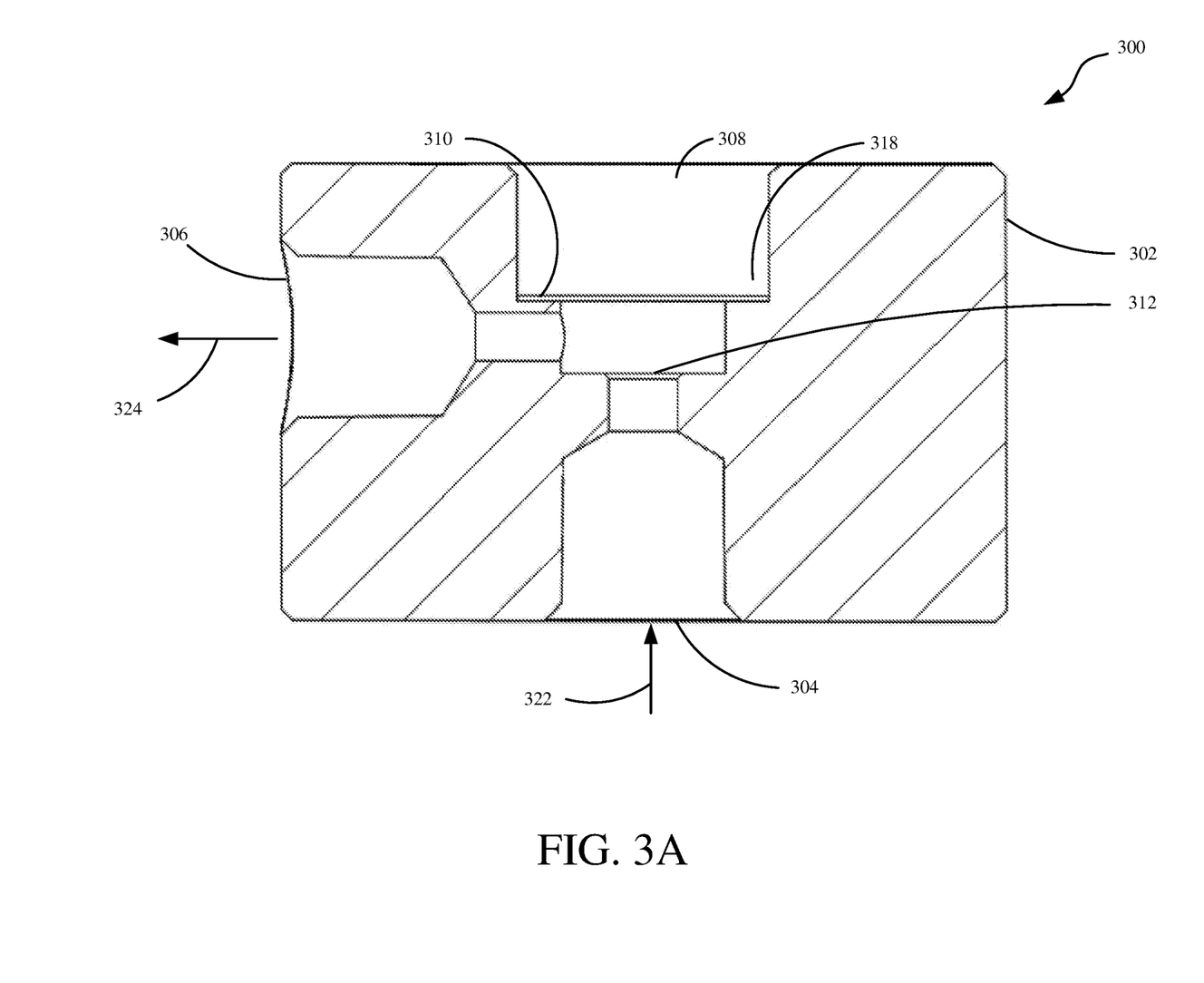
FIG. 3A is a cross-sectional view of a high pressure manifold assembly, in accordance with one embodiment of the present invention.

FIG. 3A illustratively shows a cross-sectional view of a high pressure manifold assembly 300. High pressure manifold assembly 300 illustratively includes a manifold body 302 that has a process fluid inlet 304 and a process fluid vent 306. A process fluid may be received at process fluid inlet 304 and vented, for example, via process fluid vent 306. As such, it is illustratively shown that a fluid may flow into inlet 304 in the direction generally indicated by arrow 322. Fluid may flow out of vent 306 in the direction generally indicated by arrow 324. In one embodiment, high pressure manifold assembly 300 is pressure-rated for 10,000 PSI or higher. Of course, manifold assembly 300 may be used with a variety of other pressure ratings.

High pressure manifold assembly 300 further illustratively includes high pressure channel 308 with a high pressure seat surface 310. It is shown that high pressure seat surface 310 is disposed near a distal portion 318 of channel 308. In one embodiment, high pressure channel 308 is configured to receive at least a portion of a multi-seat valve assembly within the channel. For example, a valve assembly is received within channel 308 such that an obstruction may be formed with high pressure seat 312. To prevent leakage and ensure a proper seal with channel 308, a valve assembly may include a bonnet design configured to seal to high pressure seat surface 310.

Figure 3B:
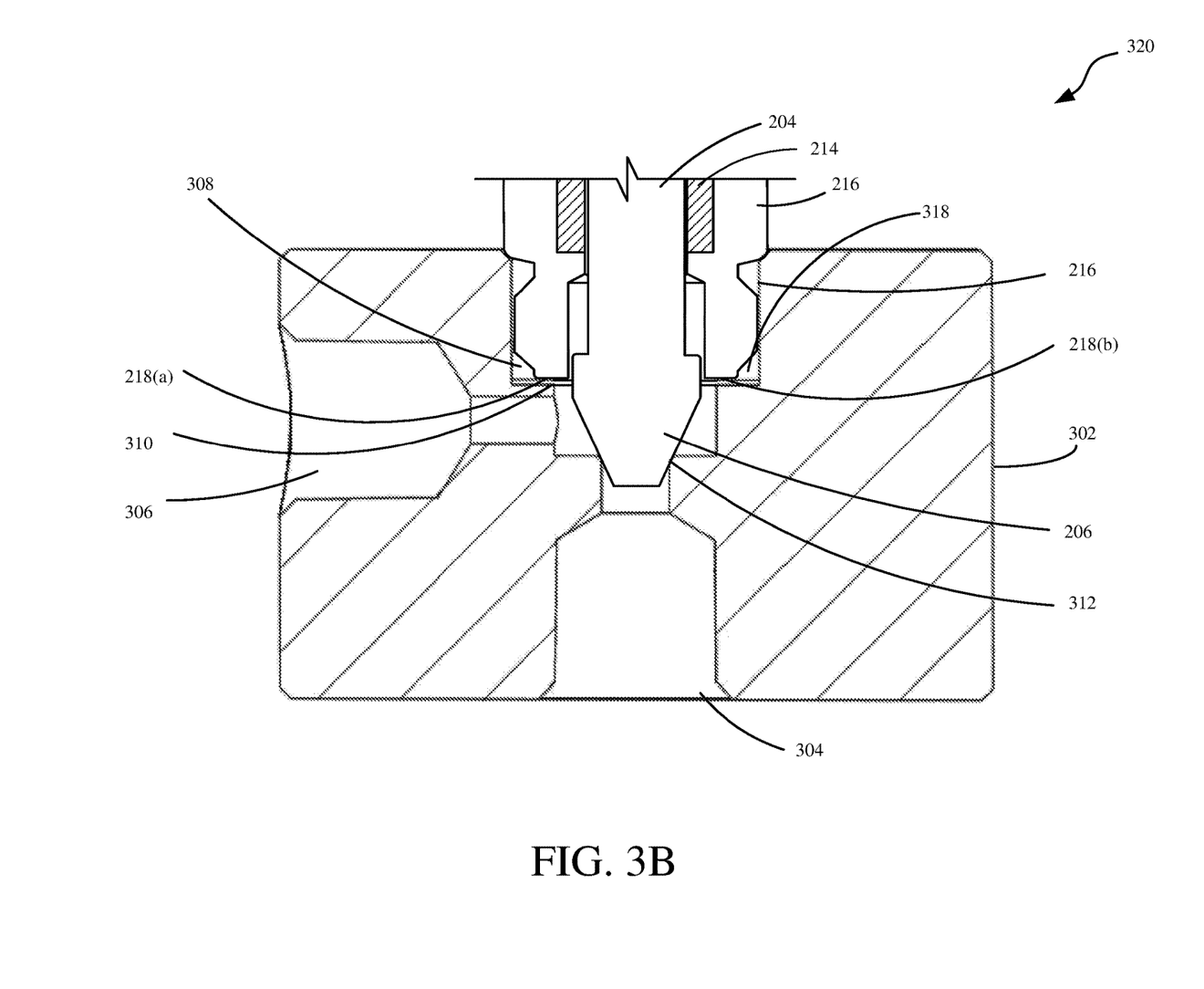
FIG. 3B is a cross-sectional view of a multi-seat valve assembly installed with a high pressure manifold assembly, in accordance with one embodiment of the present invention.

FIG. 3B is a cross-sectional view of multi-seat valve assembly 200 installed with a high pressure manifold assembly 320, in accordance with one embodiment of the present invention. It is shown in FIG. 3B that multi-seat valve assembly 200 is received at high pressure channel 308 such that bonnet 216 engages seat surface 310. As discussed above with respect to FIG. 2, bonnet 216 includes high pressure sealing surface 218, which may engage high pressure seat surface 310 disposed at or near a distal portion 318 of channel 308. In operation, actuating actuator 222 may move stem tip 206 relative to high pressure seat surface 310 and high pressure seat 312. When stem tip 206 engages high pressure seat 312 the stem tip forms an obstruction such that process fluid is restricted from flowing between inlet 304 and outlet 306. In one embodiment, high pressure seat 312 within channel 308 has a smaller diameter sealing surface than that of a lower pressure design and therefore provides less access to internal channels. Regardless of a level of access to internal channels, bonnet 216 is configured to seal with high pressure seat surface 310 with respect to high pressure channel 308. As such, multi-seat valve assembly 200 may be installed with a 10,000 PSI or higher-rated high pressure seat of a manifold assembly without significantly altering either of the valve assembly or the manifold. For example, multi-seat valve assembly 200 may be installed with an inline manifold design that is rated for 10,000 PSI or higher.

Figure 3C:
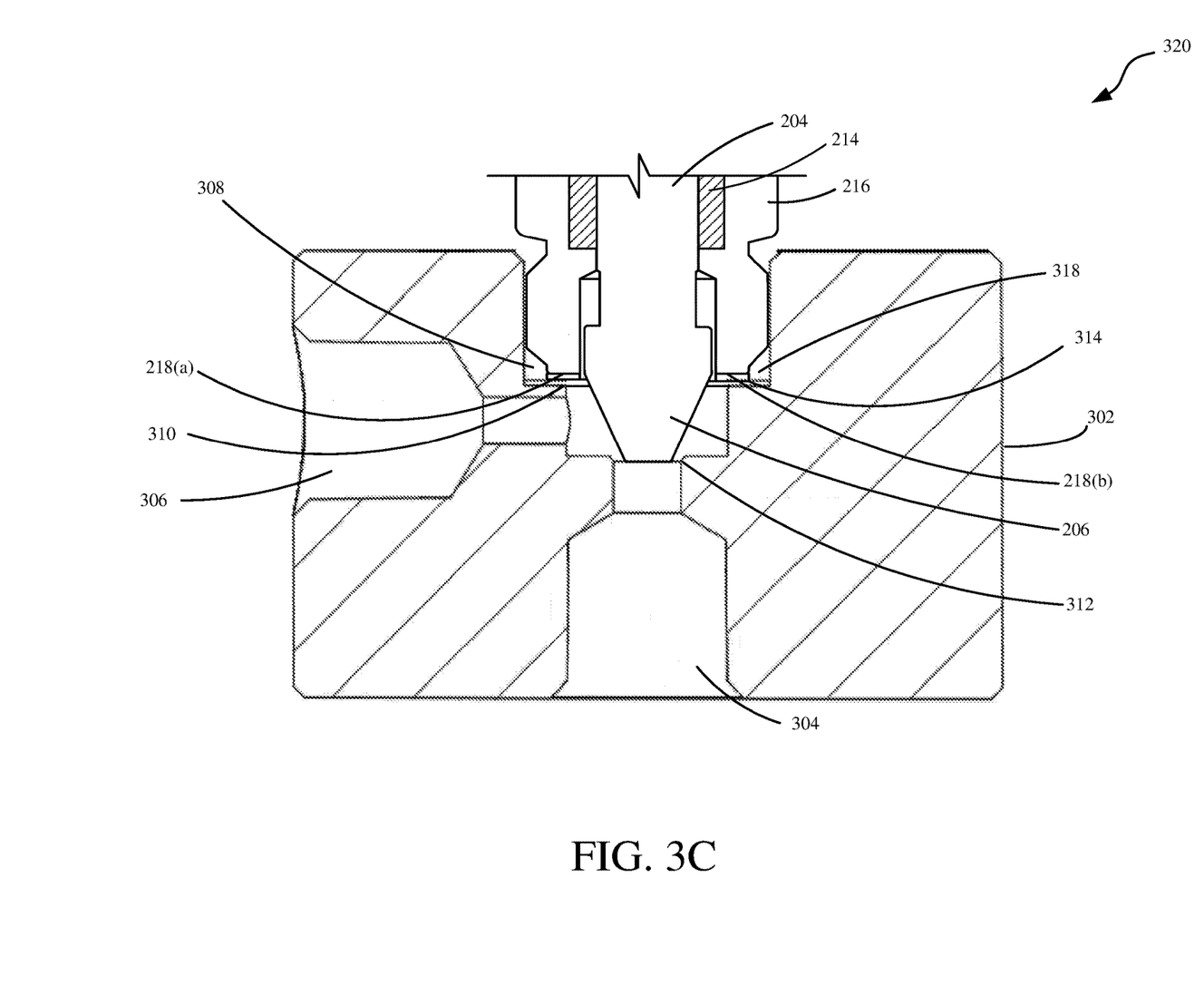
FIG. 3C is a cross-sectional view of a multi-seat valve assembly and gasket installed with a high pressure manifold assembly, in accordance with one embodiment of the present invention.

FIG. 3C is a cross-sectional view of a multi-seat valve assembly and gasket installed with a high pressure manifold assembly, in accordance with one embodiment of the present invention. In one embodiment, bonnet 216 is configured to engage a gasket 314 at or near portions 218A and 218B of first sealing surface 218. For instance, gasket 314 is disposed between sealing surfaces 218A, 218B and manifold body 302, particularly seat surface 310. Gasket 314 may improve sealing surfaces (e.g. seat surface 310) with certain combinations of material.

Figure 4A:
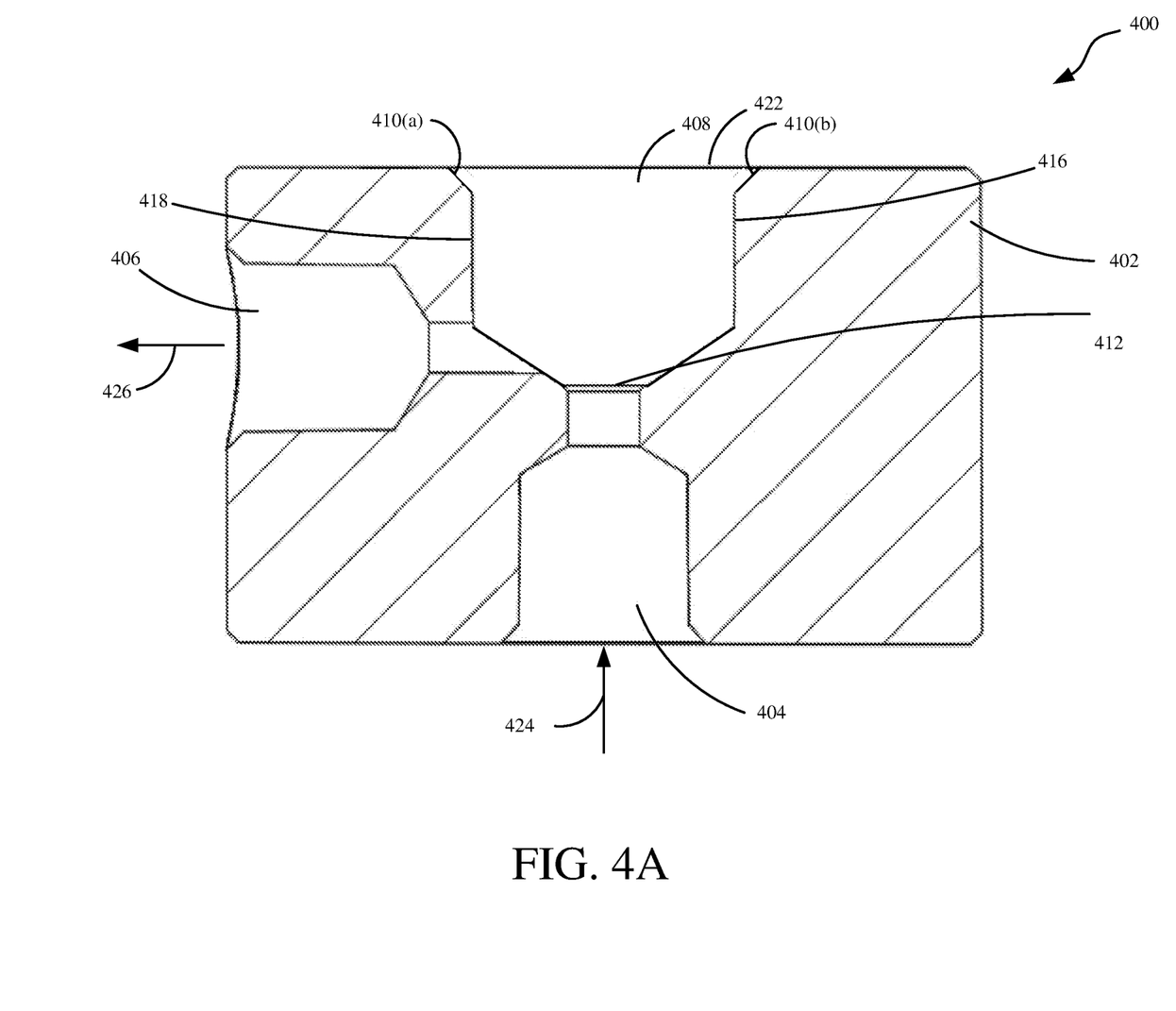
FIG. 4A is a cross-sectional view of a low pressure manifold assembly, in accordance with one embodiment of the present invention.

FIG. 4A shows a cross-sectional view of a low pressure manifold assembly 400, in accordance with one embodiment of the present invention. Low pressure manifold assembly 400 illustratively includes a manifold body 402, process fluid inlet 404, process fluid outlet 406, and a low pressure channel 408. A process fluid may be received by process fluid inlet 404 and dispensed, such that the fluid returns to the process flow, for example, via process fluid vent 406. As such, it is illustratively shown that a fluid may flow into inlet 404 in the direction generally indicated by arrow 424. Fluid may flow out of vent 406 in the direction generally indicated by arrow 426. In one embodiment, low pressure manifold assembly 400 is pressure-rated for 6,092 PSI. Of course, manifold assembly 400 may be used with variety of other low pressure ratings.

In one embodiment, low pressure channel 408 has a larger diameter sealing surface than that of a high pressure manifold design (e.g. high pressure manifold assembly 300). This increased diameter may allow for additional space within the manifold for a larger number of internal connection channels. For instance, low pressure manifold assembly 400 may be used in accordance with a coplanar integral manifold design. In one embodiment, low pressure channel 408 is configured to receive at least a portion of a multi-seat valve assembly within the channel. For example, a valve assembly is received within channel 408 such that an obstruction may be formed with low pressure seat 412. To prevent leakage and ensure a proper seal with channel 408, a valve assembly may include a bonnet design configured to seal to a low pressure sealing surface.

Low pressure channel 408 illustratively includes low pressure seat surfaces 410A and 410B. It is shown in FIG. 4A that low pressure seat surfaces 410A and 410B are proximate a channel opening 422 such that a valve can engage the sealing surfaces while providing increased access to internal channel 408. In one embodiment, seat surfaces 410A and 410B are portions of a single seat surface, generally represented by reference numeral 410, that extends around channel 408. Because FIG. 4 generally illustrates a cutaway view, seat surface 410 will be further described with respect to portions 410A and 410B.

Figure 4B:
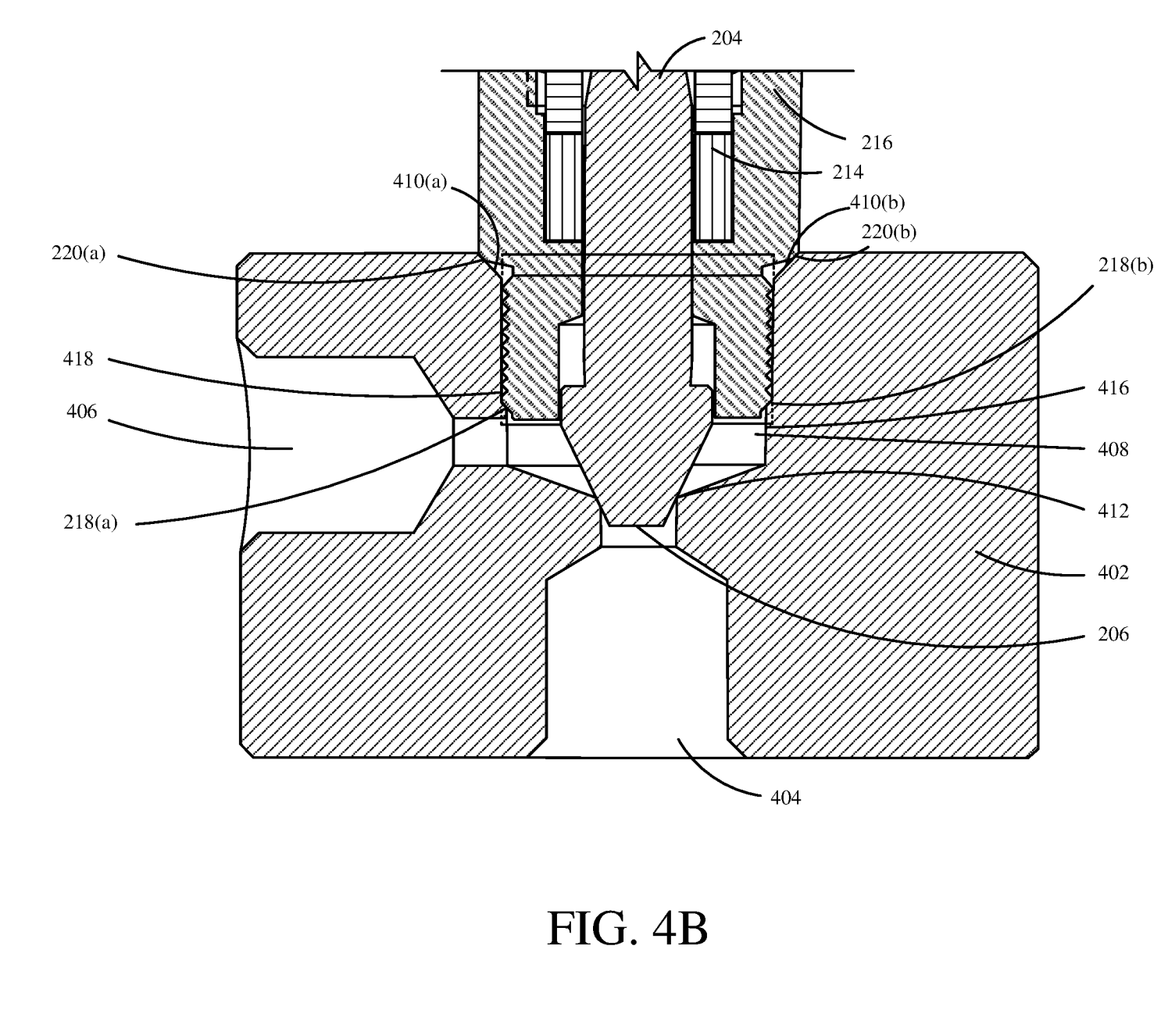
FIG. 4B is a cross-sectional view of a multi-seat valve assembly installed with a low pressure manifold assembly, in accordance with one embodiment of the present invention.

FIG. 4B is a cross-sectional view of a multi-seat valve assembly 200 installed with a low pressure seat 420. As discussed above with respect to FIG. 2, multi-seat valve assembly 200 includes second sealing surface 220 (with portions 220A and 220B) for sealing to a low pressure seat configuration. As such, it is shown that second sealing surface 220 engages seat surfaces 410A and 410B of low pressure channel 408. Seat surfaces 410A and 410B may extend at an angle of forty-five degrees relative to an axis that is defined by channel walls 416 and 418, respectively. Further, sealing surface 218 (e.g. portions 218A and 218B) of bonnet 216 may engage a portion of a sealing surface that extends horizontally from seat surfaces 410A and 410B.

In operation, stem 204 may be lowered to move stem tip 206 towards low pressure seat 412. Stem tip 206 may form an obstruction with respect to low pressure seat 412. When such an obstruction is formed between stem tip 206 and low pressure seat 412, fluid may be prevented from passing between low pressure inlet 404 and low pressure vent 406.

Figure 4C:
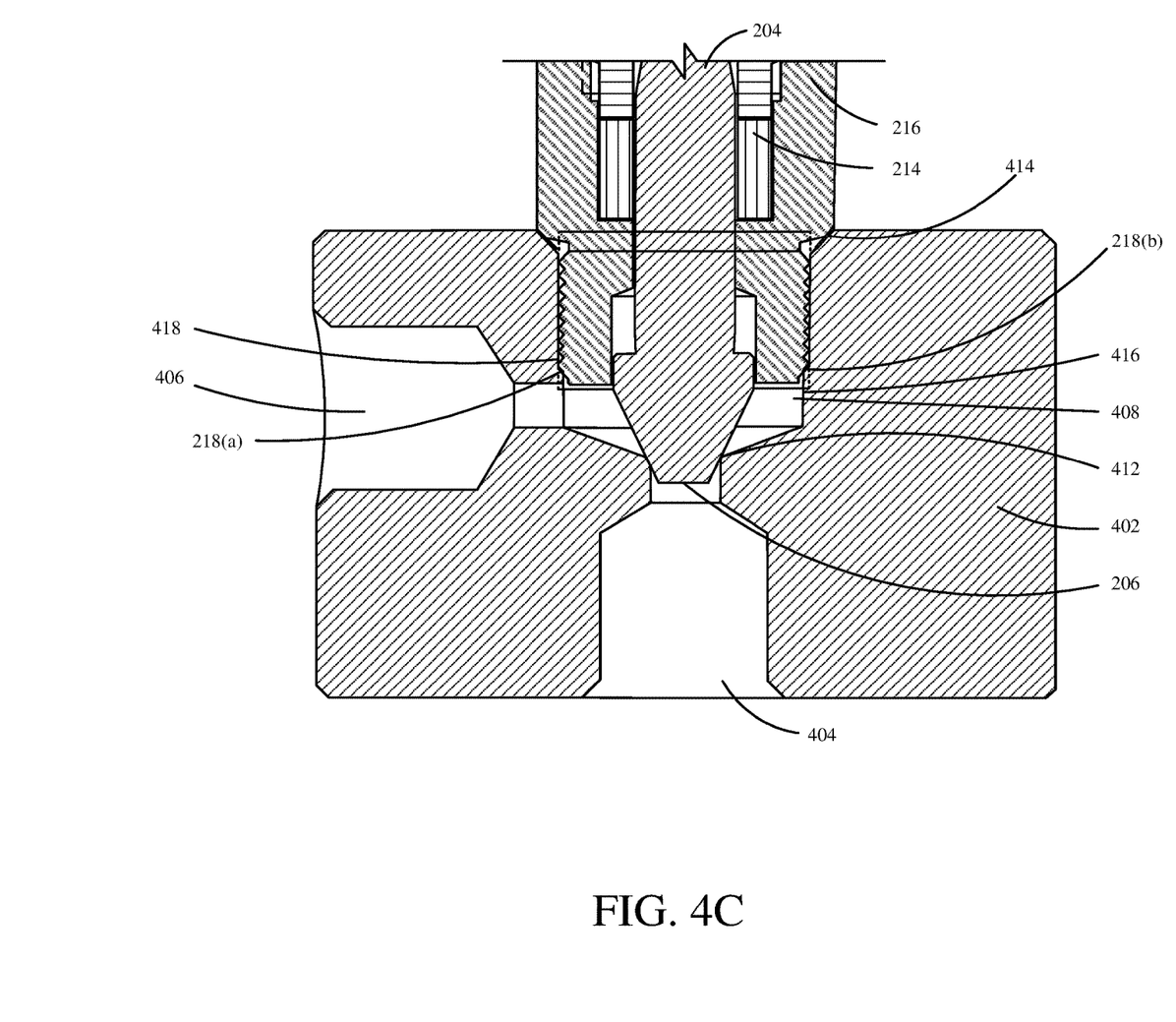
FIG. 4C is a cross-sectional view of a multi-seat valve assembly and gasket installed with a low pressure manifold assembly, in accordance with one embodiment of the present invention.

FIG. 4C is a cross-sectional view of a multi-seat valve assembly and gasket installed with a low pressure manifold assembly, in accordance with one embodiment of the present invention. In one embodiment, bonnet 216 is configured to engage a gasket 414 at or near low pressure sealing surfaces 220A and 220B. For instance, gasket 414 is disposed between sealing surfaces 220A, 220B and manifold body 402, particularly seat surfaces 410A and 410B. Gasket 414 may improve sealing surfaces (e.g. seat surfaces 410A and 410B) with certain combinations of material.

Figure 5:
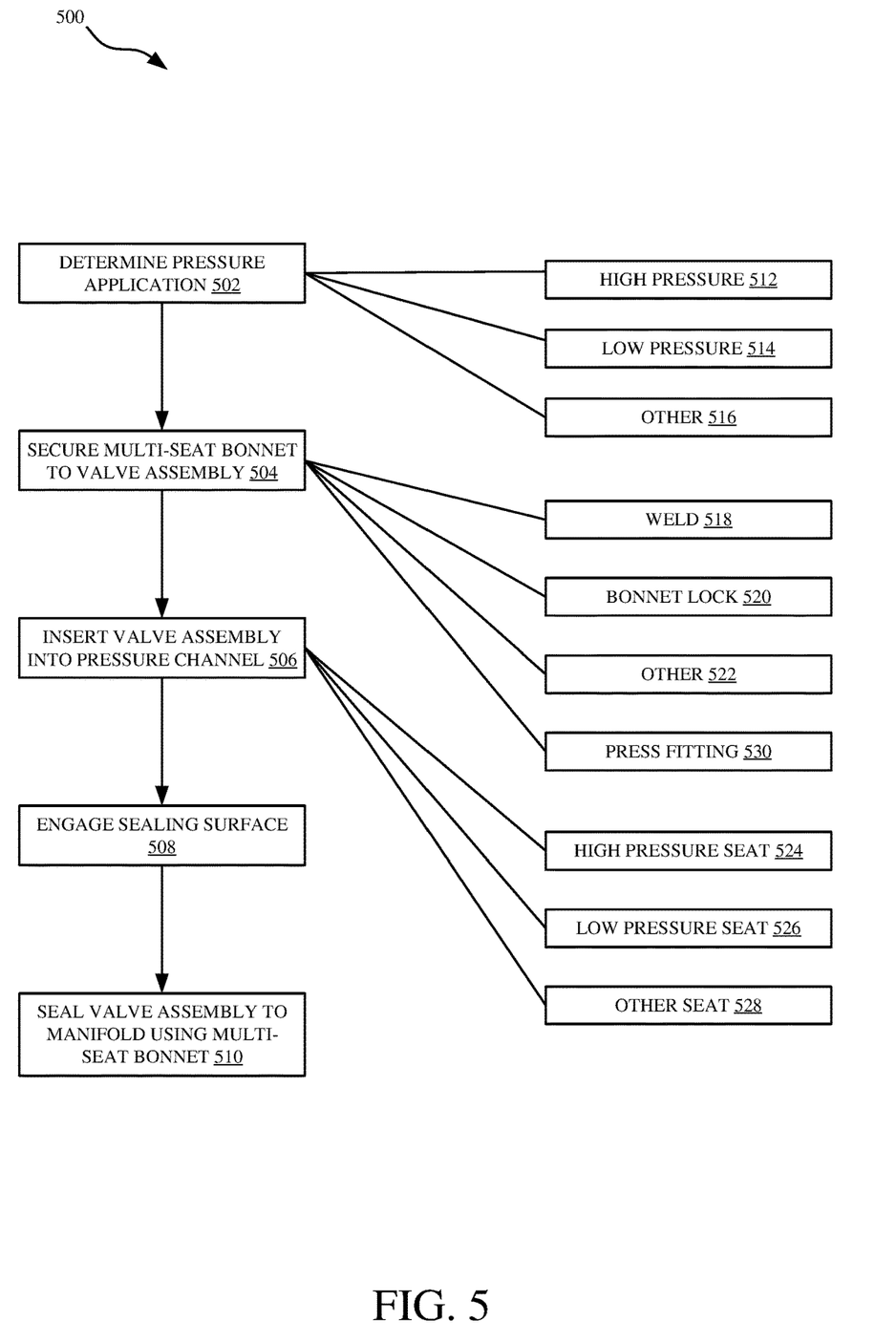
FIG. 5 is a diagrammatic view of a method of installing a multi-seat valve assembly, in accordance with one embodiment of the present invention.

FIG. 5 illustrates a diagrammatic view of a method of installing a multi-seat valve assembly 500. Method 500 illustratively includes determining a pressure application, as generally indicated at block 502. Pressure applications can vary widely based on the type of process and the type of manifold assembly that is used with a pressure transmitter. For example, a high pressure application may be determined, as indicated at block 512. Determining a high pressure application may include determining that the process includes a valve seat design with an inline manifold and a pressure rating of 10,000 PSI or higher. Further, a low pressure application may be determined, as indicated at block 514. Determining a low pressure application may include determining that the process includes an integral coplanar manifold design with a pressure rating of 6,092 PSI. Of course, a variety of other pressure applications may be determined, as indicated at block 516. It is therefore contemplated herein that a single bonnet design may be utilized with multiple valve seats with different features corresponding to a variety of pressure applications.

At block 504, method 500 includes securing a multi-seat bonnet to a valve assembly. In one embodiment, a multi-seat bonnet in accordance with method 500 includes bonnet 216 discussed with respect to FIG. 2. A multi-seat bonnet may be secured to a valve assembly in a variety of ways including, but not limited to, welding, securing the bonnet with a threaded nut, applying an adhesive material, or a variety of other securing mechanisms. Welding a multi-seat bonnet to a valve assembly is generally indicated at block 518. Securing a multi-seat bonnet to a valve assembly with a bonnet lock is generally indicated at block 520. Further, a variety of other securing mechanisms (e.g. utilizing a roll-pin) may be used to secure a multi-seat bonnet to a valve body, as indicated at block 522. In another embodiment, the multi-seat bonnet may be secured to a valve body with a securing mechanism that includes using a press fitting. Securing the multi-seat bonnet to the valve assembly can provide a mechanism to secure the variety of components to their respective portions within a valve body. Further, securing a multi-seat bonnet can form a pressure boundary between a bonnet and a valve body that may aid in preventing any leakage of a process fluid to an environment that is external to a manifold channel.

At block 506, a valve assembly is inserted into a pressure channel. Inserting a valve assembly into a pressure channel can include inserting a multi-seat bonnet into at least a portion of a pressure channel. In accordance with embodiments of the present invention, a multi-seat bonnet can be used with a variety of different pressure channels, as they vary in design based on their pressure rating for use in different process environments. For instance, a valve assembly in accordance with embodiments discussed herein can be inserted into a high pressure seat design, as indicated at block 524. In one embodiment, a high pressure seat design of block 524 includes a seat that is pressure-rated for 10,000 PSI. Further, a valve assembly in accordance with embodiments discussed herein may also be inserted into a low pressure seat design, as indicated at block 526. In one embodiment, a low pressure seat design of block 526 includes a seat that is pressure-rated for 6,092 PSI Of course, a valve assembly may be inserted into other pressure seat designs, as indicated at block 528.

At block 508, method 500 illustratively includes engaging a sealing surface with a bonnet. For instance, a high pressure sealing surface of a multi-seat bonnet engages a high pressure sealing surface of a high pressure channel. Further, a low pressure sealing surface of a multi-seat bonnet engages a low pressure sealing surface of a low pressure channel.

At block 510, a valve assembly is sealed to a manifold using a multi-seat bonnet. Sealing the valve assembly with a multi-seat bonnet may include applying an adhesive material to an intersection between sealing surfaces of the bonnet and sealing surfaces of the manifold seat. Further, sealing the valve assembly with a multi-seat bonnet may include welding the bonnet to the manifold seat. Further yet, sealing a valve assembly with a multi-seat bonnet may include actuating a handle of the valve assembly to move a stem tip such that it engages a seat to form an obstruction. In one embodiment, a multi-seat bonnet (e.g. bonnet 216) is configured to tightly seal to either of a high pressure seat or a low pressure seat without any sealing mechanisms external to that of the bonnet. For instance, the dimensions of the multi-seat bonnet are such to form a secured pressure lock with an internal channel passageway of the manifold.

Figure 6A:
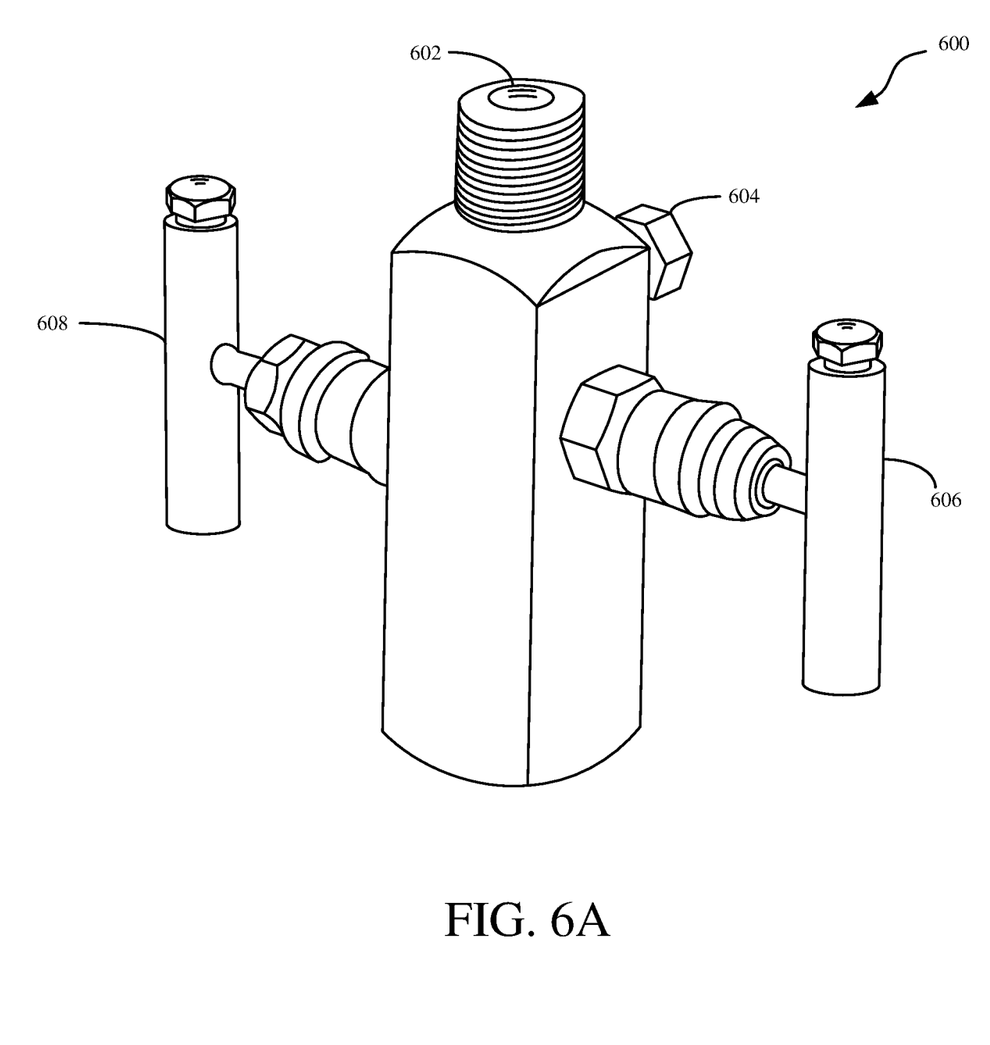
FIG. 6A is an illustrative view of a high pressure manifold assembly, in accordance with one embodiment of the present invention.

FIG. 6A is a diagrammatic view of one example of a high pressure manifold 600, in accordance with one embodiment of the present invention. In one embodiment, high pressure manifold 600 includes an inline manifold design that is configured to couple to a transmitter at transmitter interface 602. High pressure manifold 600 also illustratively includes a vent interface 604, which may be configured to provide a vent of a process fluid such that the process fluid routes to an external environment or back into the process itself. High pressure manifold 600 further illustratively includes a plurality of valve assemblies 606 and 608, that are shown as installed within the valve manifold. Valve assemblies 606 and 608 may include a multi-seat bonnet design in accordance with embodiments described herein.

Figure 6B:
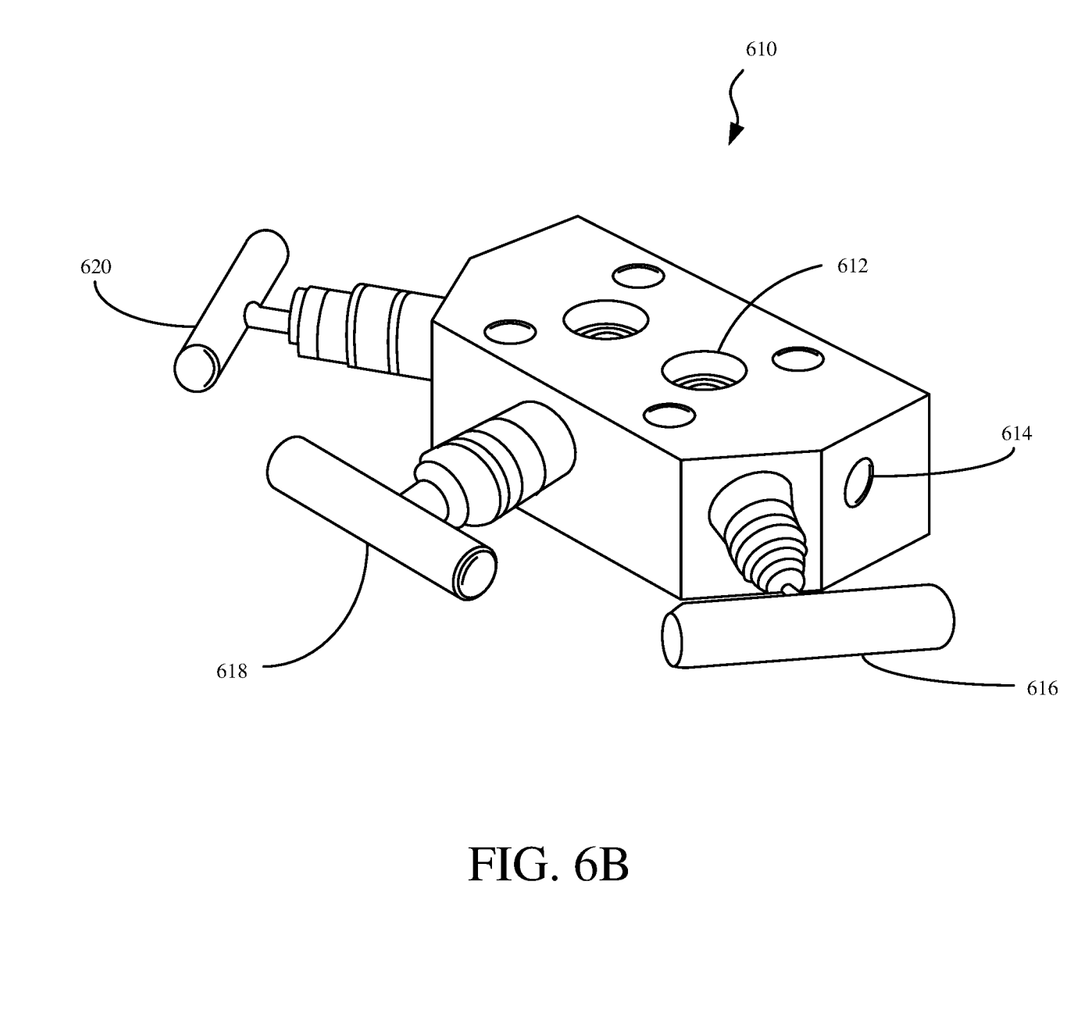
FIG. 6B is an illustrative view of a low pressure manifold assembly, in accordance with one embodiment of the present invention.

FIG. 6B is a diagrammatic view of one example of a low pressure manifold 610, in accordance with one embodiment of the present invention. Low pressure manifold 610 illustratively includes a transmitter interface 612 that may be communicatively coupled to a pressure transmitter. Low pressure manifold 610 further includes a vent interface 614 that may provide a process fluid to an external environment or route the process fluid back within the process itself. In one embodiment, low pressure manifold 610 includes an integral coplanar manifold with a plurality of valve assembly 616, 618, and 620, shown as being installed within manifold 610. Valve assemblies 616, 618, and 620 may include a multi-seat bonnet that is configured to be used with a variety of pressure rated seat designs, in accordance with embodiments described herein. For instance, valve assemblies discussed with respect to high pressure manifold 600 and low pressure manifold 610 may be interchangeable, such that a disassembly of the valve assembly is not required to move the valve assembly (e.g. valve assembly 200) to a different manifold. Rather, a single bonnet incorporated with the valve assembly can be used for a variety of pressure seat designs that conform to different pressure requirements according to each of the different manifold designs.

Although the present invention has been described with reference to preferred embodiments, workers skilled in the art will recognize that changes may be made in form and detail without departing from the spirit and scope of the invention.

What is claimed is:

1. A multi-seat bonnet for a valve assembly configured for use with both a high pressure manifold and a low pressure manifold, the multi-seat bonnet comprising: a locking mechanism configured to secure the multi-seat bonnet to the valve assembly; a first sealing surface, located at an end of the multi-seat bonnet and around a bonnet opening, configured to engage a high pressure seat of the high pressure manifold to form a high pressure bonnet seal when the multi-seat bonnet engages with the high pressure manifold; a second sealing surface configured to engage a low pressure seat of the low pressure manifold to form a low pressure bonnet seal when the multi-seat bonnet engages with the low pressure manifold; wherein the high pressure bonnet seal includes a higher pressure rating than the low pressure bonnet seal; and wherein the multi-seat bonnet engages with either the high pressure manifold or the low pressure manifold.

2. The multi-seat bonnet of claim 1, wherein the bonnet opening is configured to allow a stem of the valve assembly to protrude past the opening such that the stem engages either the high pressure seat or the low pressure seat.

3. The multi-seat bonnet of claim 2, wherein the first sealing surface is positioned adjacent the bonnet opening such that the first sealing surface engages the high pressure seat.

4. The multi-seat bonnet of claim 3, wherein the first sealing surface comprises:
a first surface portion disposed adjacent a first side of the bonnet opening and a second surface portion disposed adjacent a second side of the bonnet opening such that the first sealing surface engages one or more surfaces of the high pressure seat.

5. The multi-seat bonnet of claim 4, wherein the first surface portion and the second surface portion engage a high pressure seat surface of the high pressure seat to form a high pressure boundary.

6. The multi-seat bonnet of claim 5, wherein the high pressure boundary prevents the high pressure seat from leaking.

7. The multi-seat bonnet of claim 1, wherein the high pressure seat includes a 10,000 PSI pressure rating.

8. The multi-seat bonnet of claim 1, wherein the second sealing surface comprises a first surface portion and a second surface portion that engage, respectively, a first low pressure seat surface and a second low pressure seat surface of the low pressure seat.

9. The multi-seat bonnet of claim 8, wherein the first surface portion and the second surface portion each extend, respectively, at a forty-five-degree angle to the first sealing surface.

10. The multi-seat bonnet of claim 1, wherein the low pressure seat includes a 6,092 PSI pressure rating.

11. The multi-seat bonnet of claim 1, wherein the locking mechanism comprises a bonnet lock.

12. A multi-pressure valve assembly configured for use with both a high pressure manifold and a low pressure manifold, comprising: a valve body; a stem disposed within the valve body, wherein the stem comprises a stem tip configured to form an obstruction with at least one of a high pressure valve seat of the high pressure manifold or a low pressure valve seat of the low pressure manifold; a multi-seat bonnet that encloses the valve body, the bonnet comprising: an opening configured to allow the stem to protrude from the valve body; a first sealing surface located at an end of the opening configured to form a high pressure bonnet seal with a high pressure seat surface of the high pressure manifold when the multi-seat bonnet engages with the high pressure manifold; a second sealing surface configured to form a low pressure bonnet seal with a low pressure seat surface of the low pressure manifold when the multi-seat bonnet engages with the low pressure manifold; wherein the first sealing surface includes a higher pressure rating than the second sealing surface; and wherein the multi-seat bonnet engages with either the high pressure manifold or the low pressure manifold.

13. The multi-pressure valve assembly of claim 12, further comprising:
a handle coupled to the stem, wherein the handle is actuable to protrude the stem past the bonnet opening.

14. The multi-pressure valve assembly of claim 12, wherein the first sealing surface is configured to form the first seal with the high pressure seat that is in accordance with a 10,000 PSI pressure rating.

15. The multi-pressure valve assembly of claim 12, wherein the second sealing surface is configured to form the second seal with the low pressure seat surface that is in accordance with a 6,092 PSI pressure rating.

16. The multi-pressure valve assembly of claim 12, wherein the second sealing surface comprises a first portion and a second portion, the first and second portions being configured to extend at an angle with respect to the first sealing surface.

17. The multi-pressure valve assembly of claim 12, wherein the high pressure seat is positioned within a high pressure channel of a high pressure manifold assembly, and the low pressure seat surface is positioned within a low pressure channel of a low pressure manifold assembly, and wherein the high pressure bonnet seal forms a pressure boundary that prevents a fluid from escaping the high pressure channel and the low pressure bonnet seal forms a pressure boundary that prevents a fluid from escaping the low pressure channel.

* * * * *